United States Patent [19]

Disbrow

[11] Patent Number: 4,868,778

[45] Date of Patent: Sep. 19, 1989

[54] SPEED ENHANCEMENT FOR MULTIPLIERS USING MINIMAL PATH ALGORITHM

[75] Inventor: James E. Disbrow, Palm Bay, Fla.

[73] Assignee: Harris Corporation, Melbourne, Fla.

[21] Appl. No.: 132,186

[22] Filed: Dec. 14, 1987

Related U.S. Application Data

[63] Continuation-in-part of Ser. No. 51,386, May 19, 1987, Pat. No. 4,823,300.

[51] Int. Cl.$^4$ .............................................. G06F 7/52
[52] U.S. Cl. ..................................... 364/757; 364/754
[58] Field of Search ...................... 364/754, 757–760

[56] References Cited

U.S. PATENT DOCUMENTS

| | | | |
|---|---|---|---|
| 3,627,999 | 12/1971 | Iverson | 364/759 |
| 3,761,699 | 9/1973 | Sather | 364/759 |
| 3,866,030 | 2/1975 | Baugh et al. | 364/757 |
| 4,086,474 | 4/1978 | Negi et al. | 364/757 |
| 4,507,749 | 3/1985 | Ohhashi | 364/757 |
| 4,644,491 | 2/1987 | Ookawa et al. | 364/754 X |
| 4,761,756 | 8/1988 | Lee et al. | 364/757 |

OTHER PUBLICATIONS

Capps et al., "Two's Complement Multiplication,", IBM Tech. Disclosure Bulletin, vol. 20, No. 12, May 1978, pp. 5292–5293.
Robertson, "Two's Complement Multiplication in Binary Parallel Digital Computers", IRE-Trans.-Electronic Computers, Sep. 1955, pp. 118–119.
Davby et al., "Two Complement Multiplier", IBM Tech. Disclosure Bulletin, vol. 18, No. 5, Oct. 1975, pp. 1482–1483.

Primary Examiner—Gary V. Harkcom
Assistant Examiner—Tan V. Mai
Attorney, Agent, or Firm—Barnes & Thornburg

[57] ABSTRACT

A binary multiplier architecture which multiplies signed and unsigned operands as unsigned numbers and adds a correction factor which is the two's complement of the other operand if the operand is signed. The multiplier architecture performs two's complement multiplication when the multiplier has 1's in more than half of its bits and performs unsigned binary multiplication by adding only shifted multiplicand vectors as a function of the multiplier all other times. Two's complement multiplication is performed by adding a multiplicand and a multiplier to two's complemented shifted multiplicand vectors as a function of the two's complement of the multiplier. To reduce the number of additions necessary, portions of the operands are merged with the shifted complemented vectors prior to addition to the shifted vectors.

13 Claims, 5 Drawing Sheets

SPEED ENHANCEMENT FOR MULTIPLIERS USING MINIMAL PATH ALGORITHM

CROSS REFERENCE TO RELATED APPLICATION

This application is a Continuation-in-Part of U.S. patent application Ser. No. 051,386, filed on May 19, 1987, by C. W. Malinowski, now U.S. Pat. No. 4,823,300.

BACKGROUND AND SUMMARY OF THE INVENTION

The present invention relates generally to binary multipliers and more specifically to an improved speed binary multiplier capable of multiplying signed and unsigned operands.

All modern fast binary multipliers utilize some variations of the basic partial-product generation technique first applied by Seymour Cray and commonly referred to as "combinatorial", "paper and pencil", or "flow-through". In its most common form the technique simply involves consecutive multiplications of a K-digit long operand A (multiplicand) by a single digit B(i) of the M-digit long operand B (multiplier) and then shifting the resultant partial product P(i) to the left by the number of places equal to the position of the digit B(i) in the multiplier. In this particular case it is assumed that the number of places the partial product is to be shifted is directly equal to i. The shifting operation is, in fact, equivalent to the multiplication of the multiplicand by the weight of the decimal (or binary) digit B(i).

After generating all M partial products, they are then consecutively summed to yield the final (M+K) digit-long final product of A and B. This technique, used for decimal number multiplication is also directly applicable to the principle of binary multiplication of two numbers A and B, their respective binary widths being K and M. The example of multiplication of such 4-bit operands A=0111=7 and B=0011=3 is given in Table 1.

TABLE 1

| "Paper-and-pencil" multiplication of two 4-bit operands. | |
|---|---|
| MULTIPLICAND A: 0 1 1 1 | = 7 |
| MULTIPLIER B: 0 0 1 1 | = 3 |
| 0 1 1 1 | partial product 1 |
| 0 1 1 1 | partial product 2 |
| 0 0 0 0 | partial product 3 |
| 0 0 0 0 | partial product 4 |
| 0 0 0 1 0 1 0 1 | final product |

The ability to multiply signed numbers is more difficult. In a two's-complement notation when the most significant bit is a zero it is designated as a positive number, whereas when the most significant bit is a 1 it is designated as a negative number. One way to perform multiplication of signed operands is to convert the negative numbers to their positive binary representation, multiply the positive or unsigned versions and attach the appropriate sign. If both the operands have the same sign, the unsigned product would be the product, since it is positive. If either of the operands were negative, the two's complement of the product must be performed.

An alternative to the conversion to an unsigned magnitude and reconversion of the final product is illustrated in Table 2.

TABLE 2

| Multiplication of Two's Complement Operands with Sign Extension. | | | |
|---|---|---|---|
| | 1 0 0 1 | | (Multiplicand) = −7 |
| | ×1 1 0 1 | | (Multiplier) = −3 |
| Partial Product #1 | 1 0 0 1 | − | Extended Sign = 1111001 |
| Partial Product #2 | 0 0 0 0 | − | Extended Sign = 000000 |
| Partial Product #3 | 1 0 0 1 | − | Extended Sign = 11001 |
| Partial Product #4 | 1 0 0 1 | − | Two's Complement = 0111 |
| | | | Final Product = 0010101 |

The first three partial products are performed with sign extension. The fourth partial product, which is the sign bit, is converted to a two's complement notation before addition with the other partial products. This is to correct for the negative sign bit in combination with the sign extension.

As is apparent from Tables 1 and 2 besides some input and output reformatting of the operands and final product, the bulk of multiplication of time, even in its simplest form, is consumed by the M-1 additions required to generate the sum of partial products. In fact, all the algorithmic speed improvements brought into the design of parallel multipliers have involved the reduction of the number of additions necessary to generate the final product, as well as acceleration of the necessary additions (application of "carry-save" adders). The most common techniques used today employ algorithmic refinements of the basic concept described above; they are known as "Wallace Tree Partial Product Reduction" and "Modified Booth Algorithm".

Application of these two techniques combined leads to the potential reduction of the necessary number of partial product additions to one half the number of bits in the multiplier. Consequently, the amount of time necessary for the partial products to flow through the adder array is also cut in half. However, this is accomplished at the expense of using a relatively complex Booth decoder.

Booth algorithm, compared to the present invention, introduces not only extra delays caused by a more complex Booth Decoder, but also results in increased circuit size due to the need of propagating the sign extension through the CSA (Carry Save Adder) array. This also leads to poorer time performance. For example, in Table 1, partial products 1, 2 and 3 would include three, two and one sign extending bits, respectively.

Thus, using the example of Table 1, the Booth multiplication array increases generally quadratically with the number of partial products that must be performed, whereas the combinational multiplication array of Table 1 varies linearly with the number of bits.

The original Booth algorithm and the modified Booth algorithm involve searching for and determining strings of zeros or ones in the multiplier and performing addition and subtraction for the different partial products depending upon a determination of the beginning, end or middle of the string.

In combinatorial multiplication, a relative 1-digit shift always occurs between the multiplicand and the partial sum, regardless of whether an addition has occurred or not. Booth's algorithm permits more than one shift at a time, depending on the grouping of ones and zeros in the multiplier bit by bit, starting with the LSB, shifting the partial product relative to the multiplicand as each bit is examined. Subtract the multiplicand from the partial product when you find the first one in a string of ones. Similarly, upon finding the first zero in a string of zeros, add the multiplicand to the partial product. Perform no operation when the bit examined is identical to the previous multiplier bit.

A modified version of Booth's algorithm is more commonly used. The difference between the Booth's and the modified Booth's algorithm is as follows: The modified Booth always generates n/2 independent partial products, whereas the original Booth generates a varying (at most n/2) number dependent of partial products, depending on the bit pattern of the multiplier. Of course, parallel hardware implementation lends itself only to the fixed independent number of partial products. The modified multiplier encoding scheme encodes 2-bit groups and produces five partial products from an 8-bit multiplier, the fifth partial product being a consequence of the fact that the algorithm only handles two's complement numbers (only four partial products are generated if only two's complement representation is used).

State-of-the-art multipliers, such as those employed in DSP (Digital Signal Processing) architectures, should also be capable of performing accumulation of the products, as well as be capable of operating on both unsigned integers and two's complemented binary words. Also, in the case of more advanced circuits, the addition of both input operands may be required.

Thus, an object of the present invention is to provide a multiplier architecture that possesses all of the above capabilities and matches, if not exceeds, the speed performance of the similar circuits designed around combined Booth algorithm/Wallace tree reduction schemes.

Another object of the present invention is to provide a multiplier architecture which is capable of 4×4, 8×8, 16×16 and other capacities while maintaining the desired speed characteristics.

A still further object of the present invention is to provide a multiplier architecture whose CSA array size increases almost linearly with the increase of operand widths as compared to quadratic growth in size of Booth architectures.

An even further object of the present invention is to provide the capability of multiplying signed and unsigned numbers without increasing the amount of time over that of multiplying only unsigned numbers.

These and other objects of the invention are attained by a multiplier architecture that reduces the number of partial product additions by performing an unsigned binary multiplication whenever the number of 1's in the multiplier is less than or equal to half the multiplier's binary width and negative or two's complement multiplication of the operands whenever the number of 1's in the multiplier exceeds half of its binary width.

The ability to handle signed and unsigned numbers while not increasing the time it takes to perform the multiplication results from determining the need for and calculate a correction factor in parallel with the multiplication scheme. Multiplication is performed for the two operands as if they were unsigned numbers without any conversion. If the first operand is negative, a first correction, which is the two's complement of the second operand, is added to the product. If the second operand is negative, a second correction, which is the two's complement of the first operand, is added to the product. If both operands are negative, the two's complement of both operands are added to the product.

The architecture includes circuitry for determining when to take a two's complement, first and second complementers, a shifter, a signed operand corrector and an adder. The determining circuit determines and provides a two's complement signal when the multiplier has 1's in more than half of its bits. The first complementer provides a multiplicand vector as a two's complement of the multiplicand in response to the two's complement signal or the multiplicand in the absence of the two's complement signal. The second complementer provides shift control signals as a function of the two's complement of the multiplier in response to the two's complement control signal or as a function of the multiplier in the absence of the two's complement control signal. A shifter circuit provides a plurality of shifted multiplicand vectors as a function of the shift control signals from the second complementer. The sign operand corrector circuit is in parallel to the shifter circuit and provides the two's complement of one of the operands if the other operand is negative. The adder adds the multiplicand, the multiplier, the corrections, and the plurality of shifted multiplicand vectors in response to the two's complement signal, or adds only the corrections and the plurality of shifted multiplicand vectors in the absence of the two's complement signal to produce a product. The corrections are generated only if one of the operands is signed or negative.

The shifter circuit includes a merging circuit for merging bits of the operands with the shifted multiplicand vectors in response to the complement signal. Logic is provided for selecting which bit of which shifted multiplicand vector the bits of the operand are merged as a function of the multiplier. Portions of the bits of the operand are assigned to particular shifted multiplicand vectors and the remaining bits of the operand are assigned by the logic as a function of the multiplier. One of the operands is merged in the shifters with the other operand being a direct input to the adder circuit.

A 4/K architecture is used wherein K bit long multiplicand A is multiplied in parallel by 4-bit slices of the multiplier and the result in partial vectors are summed in carry-save arrays.

Other objects, advantages and novel features of the present invention will become apparent from the following detailed description of the invention when considered in conjunction with the accompanying drawings.

DETAILED DESCRIPTION OF THE DRAWINGS

The multiplier architecture of the present invention which will be known as Minimal Path Algorithm (MPA) is based on a simple observation that the absolute predictable number of single multiplications necessary to generate the sum of partial products is equal to the number of 1's contained within the multiplier B. In other words, if a 4-bit multiplier B is 1010 (LSB rightmost), the product A*B can be obtained in this case simply by adding the multiplicand A, say 1101, to itself shifted by two places to the left to produce a product of 110110. Unfortunately, the number of 1's or (0's) in the multiplier cannot be determined in advance; therefore the adder array has to be "prepared" for the worst case condition (i.e. multiplier equal to 1111) and, consequently three consecutive addition must be performed even if no reduction scheme is used. Moreover, if the multiplication involves negative (two's complement) numbers the product must be reformatted to its either positive or negative form requiring an extra addition.

By controlling the representation of the multiplier bits such that the multiplier would never contain more 1's than half the number of its bits, the number of necessary additions required to perform the multiplication could be reduced by half. In particular, in the case of 4-bit muliplication, only a single addition would be required. This is achieved by using the two's complement representation of unsigned binary numbers which originally contained more 1's than half of their total number of bits. Thus by verification of the number of 1's in the multiplier, the multiplier's representation may be controlled so that the number of 1's contained in it is always equal to or less than half of its binary width.

The MPA architecture of the present invention allows the reduction of the number of partial products additions by performing an unsigned binary multiplication whenever the number of 1's width, in multiplier is less than or equal to half the multiplier's binary width, and two's complement multiplication of the operands whenever the number of 1's in the multiplier exceeds half of its binary width. Since the product of two two's complemented operands can be represented as:

$$P = (2^K - A) * (2^M - B) = 2^{K+M} - 2^K * B - 2^M * A + A * B \quad (1)$$

where K and M are the respective binary widths of multiplicand A and multiplier B.

Thus, if the two's complement multiplication took place, the unsigned (or positive) product or A and B is obtained as:

$$A*B = P + 2^K * B + 2^M * A \quad (2)$$

with the overflow term $2^{K+M}$ discarded, since it exceeds the system representation range $0 \ldots 2^{K+M} - 1$.

An enhancement to the MPA is the ability to multiply signed magnitude two's complement numbers without any increase in number of propagation delays in the multimultiplier's critical path.

Signed magnitude two's complement multiplication enhancement is implemented by adding the two's complement value of the multiplier B shifted by $2^{K+1}$ if the multiplicand A is negative. If the multiplier B is negative, then the two's complement multiplicand A, shifted by $2^{M+1}$ is added to the product. If the multiplier B and the multiplicand A are both negative, then the sum of the two's complement of both multiplier B and multiplicand A, each shifted by $2^{K+1}$ and $2^{M+1}$, respectively, is added to the product.

For example, if the operands to multiplied are A and B and their values are signed magnitude two's complement numbers, when A and B are both positive, then there is no correction:

$$+A^* + B = AB \quad (3)$$

If A is negative and B is positive, then there is a need to add a correction:

$$-A^* + B = (2^{K+1} - (+A)) * (+B) = (2^{K+1})B - AB \quad (4)$$

If A is positive and B is negative, then there is a need to add a correction:

$$+A^* - B = (2^{M+1} - (+B)) * (+A) = (2^{M+1})A - AB \quad (5)$$

If A is negative and B is negative, then there is a need to add two corrections:

$$-A^* - B = (2^{K+1} - (+A)) * (2^{M+1} - (+B)) = 2^{K+M+2} + (2^{M+1})A + (2^{K+1})B + AB \quad (6)$$

The product $2^{K+M+2}$ is outside of the $2^{K+M}$ maximum representation range of the product, consequently:

$$-A^* - B = (2^{M+1})A + (2^{K+1})B + AB \quad (7)$$

The implementation of the sign magnitude two's complement multiplication is accomplished by adding the one's complement plus one to the carry-save array if one operand is negative. If both operands are negative, then the one's complement of both operands plus two must be added to the carry-save array. In the MPA algorithm, such addition may be performed with no speed penalty, because this correction is inserted into the carry-save array at a point ahead of the generation of the partial products. Such insertion is made possible since there is no need for propagation of sign extension in the MPA. Therefore, the bit locations $2^{(K \text{ or } M)+1}$ to $2^{K+M}$ are available in the carry-save array without adding any extra logic levels to the array. Conversely, implementation of such enhancement in the most commonly used "Booth's Algorithm" would not be possible. This algorithm does not contain free $2^{(K \text{ or } M)+1}$ through $2^{K+M}$ carry-save locations in the array, due to the need for propagation of the partial product sign extension throughout the carry-save array.

Although the conversion of the two's complemented product to the unsigned format and two's complement for negative signed operands implies the necessity to perform extra additions, as it will be seen further, such additions do not contribute to the regular multiplication time, as they can be performed in parallel with the MPA encoding.

Figure 1:
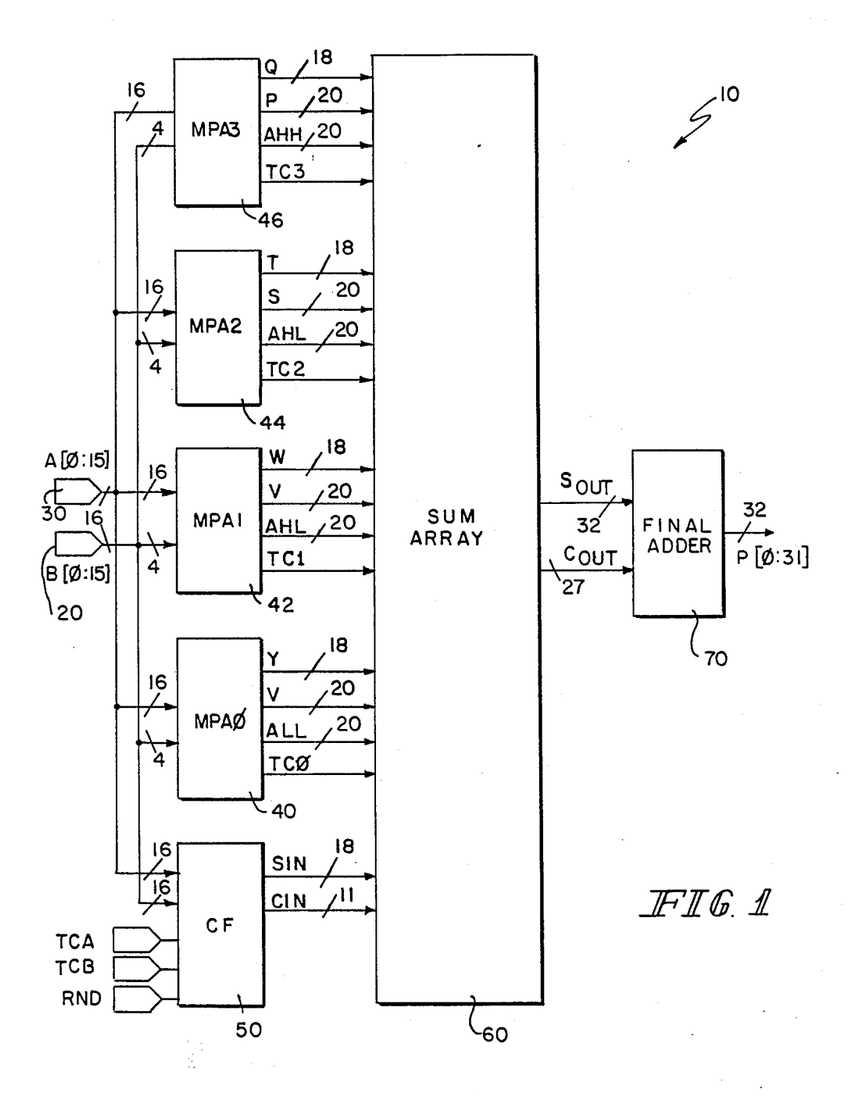
FIG. 1 is a block diagram of a 16×16-bit multiplier according to the principles of the present invention.

To illustrate the principles of the present invention, a 16×16-bit multiplier 10 is illustrated in FIG. 1 using a 4/K architecture. This is where a 16-bit multiplicand A is multiplied in parallel by four 4-bit slices of the multiplier B and the resulting vectors are summed in a carry-save array or tree. Although the 4/K architecture is shown, the present invention may also be implemented using a full 16-bit wide architecture, with a 16-bit wide Two's Complement signal generation. Also, it may be implemented using a full 4-bit slice matrix where 8 separate parallel multiplications are performed on 4-bit slices of the multiplicand and multiplier.

The multiplier 10 of the present invention as illustrated in FIG. 1 includes a pair of inputs 20 and 30 for receiving a 16-bit multiplier B and a 16-bit multiplicand A, respectively. The 16-bit multiplicand A is provided to four slice Minimum Path Algorithm (MPA) multipliers 40, 42, 44, 46 and to a correction factor circuit 50. The multiplier B is provided on a 4 slice basis to the MPA-0 through MPA-3 40, 42, 44, 46 and as a 16-bit multiplier B to the correction factor circuit 50. The other inputs to the correction factor circuit 50 include a two's complement signal TCA for the multiplicand A, a two's complement signal TCB for the multiplier B, and a rounding command signal RND. The MPA-0 through MPA-3 each provide three output vectors and a two's complement signal TC to the Sum Array 50. Typically, the Sum Array is a carry-save adder. The vectors from the MPAs 0-3 are used to satisfy equation (2) above. The correction factor from the correction factor circuit 50 provides a sum-in SIN and a carry-in CIN signal to the Sum Array 50 depending upon the complemented or non-complemented condition of the multiplier A and multiplicand B according to equations (3) through (6). The Sum Array 50 provides a sum output SOUT and a carry output COUT to the final adder 70 which provides a 32-bit output vector P(0:31).

By using the MPA techniques in circuits MPA-0 through MPA-3 in a 4/K architecture, there are no more than two partial products for the multiplication of the slice multiplier and the multiplicand. These two partial products, shifted to their appropriate positions, are X and Y for MPA-0, W and V for MPA-1, S and T for MPA-2 and P and Q for MPA-3. For two's complement multiplication, equation (2), for each of the MPAs 0-3, becomes equations (8) through (11) as follows:

$$A*B[0,3] = P_0 + 2^4*A + 2^8*B[0,3] \quad (8)$$

$$A*B[4,7] = P_1 + 2^4*A + 2^8*B[4,7] \quad (9)$$

$$A*B[8,11] = P_2 + 2^4*A + 2^8*B[8,11] \quad (10)$$

$$A*B[13,15] = P_3 + 2^4*A + 2^8*B[13,15] \quad (11)$$

Figure 2A:
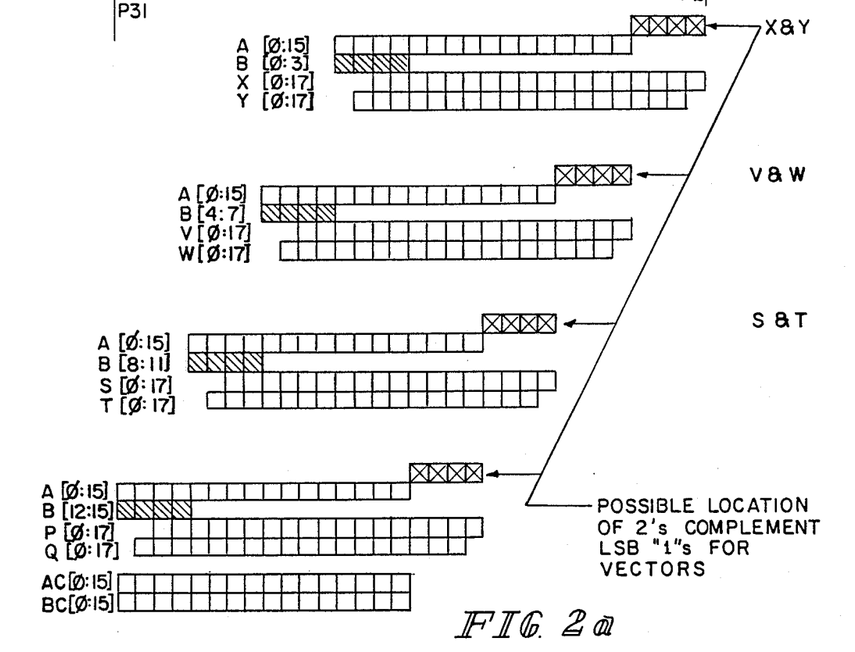
FIGS. 2a and 2b are charts of the input and combination of inputs to a 16×16 multiplier according to the principles of the present invention.

The appropriate shifting and position of the vectors relative to each other including the correction vector AC and BC for two's complement inputs is illustrated in FIG. 2a.

Two's complementation of the multiplicand A in the MPA involves a single bit-by-bit complementation of all the bits of the multiplicand A and then the addition of "1" to A's least significant bit. The addition of the "1" at the least significant bit may be carried out at any stage in the multiplication ladder. The "1" to be added will be known as the extra LSB bits. The extra LSB bits are shown in FIG. 2a as the boxes with the X's. Two of the four boxes will have a "1" therein depending upon the position of the vectors X,Y; V,W; S,T; and P,Q.

Figure 2B:
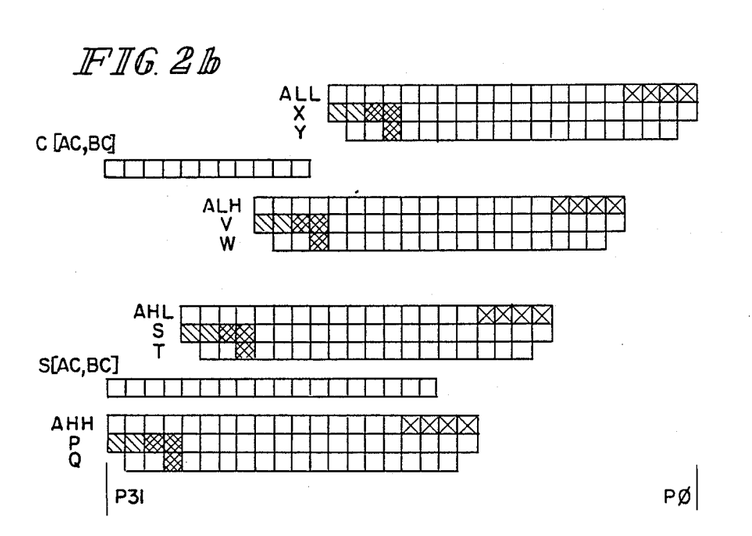

The extra LSB bits, the multiplicand A, the 4/K slice multiplier B and the vectors X,Y; V,W; S,T; and P,Q are merged using the MPA principle of operation to produce the vectors ALL, X, Y, ALH, V, W, AHL, S, T, AHH, P, Q as illustrated in FIG. 2b. The correction factors AC and BC are converted to sum correction S(AC,BC) and carry correction C(AC,BC). Before describing the ability to form the merge vectors of FIG. 2b from FIG. 2a, a description of a typical MPA structure will be provided with reference to FIG. 3.

Figure 3:
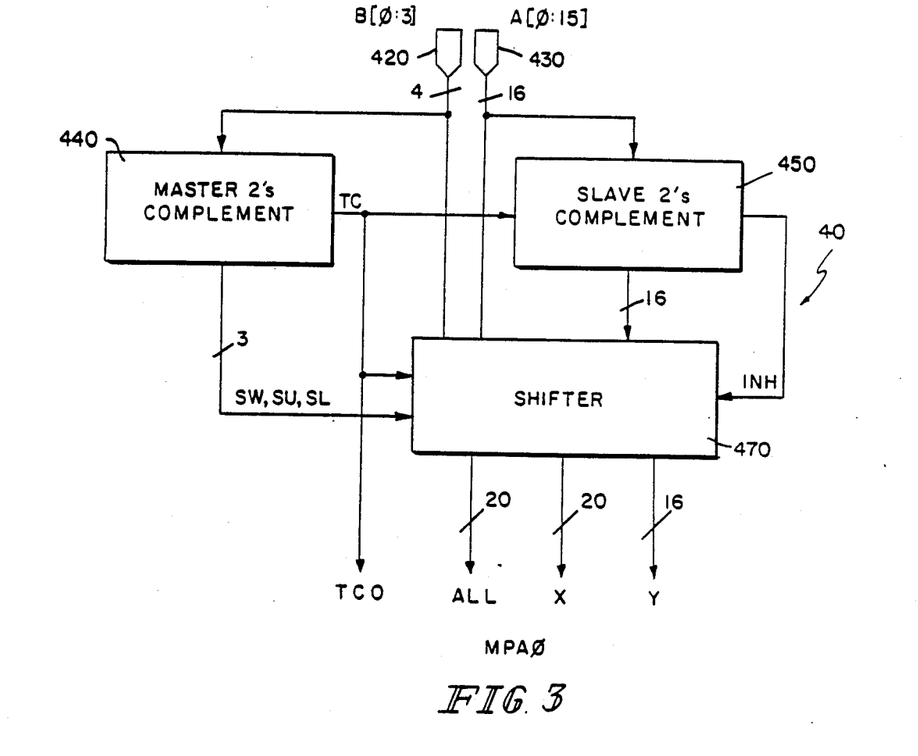
FIG. 3 is a block diagram of a Minimum Path Algorithm (MPA) multiplier and complementer of FIG. 1.

FIG. 3 illustrates a 16×4-bit slice multiplier MPAO 40 having an input 420 for a 4-bit multiplier slice B0 through B3 and an input 430 for a 16-bit multiplicand A0 through A15. Inputs for the multiplier and the multiplicand 420, 430 are connected respectively to a Master Two's Complementer (MTC) 440 and a Slave Two's Complementer (STC) 450 as well as both being provided to a Shifter 470. Control bits from the MTC 440 are provided to the STC 450, the Shifter 470 and the Sum Array 50. The output of the STC 450 is also provided to the Shifter 470. The output of the vectors of Shifter 470 is provided to the Sum Array 50.

The MTC 440 determines when the number of 1's of the multiplier slice B exceeds half the width of the multiplier and provides a two's complement signal TC to the STC 450 to force two's complementation of the multiplier A. The signal TC is also provided to the Shifter 470 and Sum Array 50 to control the addition of the operand's sum to the partial product. The MTC 440 also generates multiplicand vector shift control signals SL and SU and provides them to the Shifter 470. A swap control bit of the MTC 440 is provided to the Shifter 470 to control placement of a bit from the multiplier slice B into one of the multiplicand vectors in Shifter 470.

The MPA map of Table 3 shows the relationship between the input multiplier bits B0 through B3, the two's complemented multiplier bits BC0 through BC3, the two's complemented control signal TC, the swap signal and the shifter control signals SL0 through SL2 and SU0 through SU2. From this map, the equations for the shifter control bits of Table 4 are derived and implemented in FIG. 3.

TABLE 3

MPA Map.

| Multiplier Bits | | | | Two's Complemented Bits | | | | | | Shifter Control Bits | | | | | |
|---|---|---|---|---|---|---|---|---|---|---|---|---|---|---|---|
| B3 | B2 | B1 | B0 | BC3 | BC2 | BC1 | BC0 | TC | SWAP | SU0 | SU1 | SU2 | SL0 | SL1 | SL2 |
| 0 | 0 | 0 | 0 | | | | | 0 | 0 | 0 | 0 | 0 | 0 | 0 | 0 |
| 0 | 0 | 0 | 1 | | | | | 0 | 0 | 1 | 0 | 0 | 0 | 0 | 0 |
| 0 | 0 | 1 | 0 | | | | | 0 | 0 | 0 | 1 | 0 | 0 | 0 | 0 |
| 0 | 0 | 1 | 1 | | | | | 0 | 0 | 1 | 0 | 0 | 1 | 0 | 0 |
| 0 | 1 | 0 | 0 | | | | | 0 | 0 | 0 | 0 | 1 | 0 | 0 | 0 |
| 0 | 1 | 0 | 1 | | | | | 0 | 0 | 1 | 0 | 0 | 0 | 1 | 0 |
| 0 | 1 | 1 | 0 | | | | | 0 | 0 | 0 | 1 | 0 | 0 | 1 | 0 |
| 0 | 1 | 1 | 1 | 1 | 0 | 0 | 1 | 1 | 0 | 1 | 0 | 0 | 0 | 0 | 1 |
| 1 | 0 | 0 | 0 | | | | | 0 | 0 | 0 | 0 | 0 | 0 | 0 | 1 |
| 1 | 0 | 0 | 1 | | | | | 0 | 0 | 1 | 0 | 0 | 0 | 0 | 1 |
| 1 | 0 | 1 | 0 | | | | | 0 | 0 | 0 | 1 | 0 | 0 | 0 | 1 |
| 1 | 0 | 1 | 1 | 0 | 1 | 0 | 1 | 1 | 0 | 1 | 0 | 0 | 0 | 1 | 0 |
| 1 | 1 | 0 | 0 | | | | | 0 | 0 | 0 | 0 | 1 | 0 | 0 | 1 |
| 1 | 1 | 0 | 1 | 0 | 0 | 1 | 1 | 1 | 0 | 1 | 0 | 0 | 1 | 0 | 0 |
| 1 | 1 | 1 | 0 | 0 | 0 | 1 | 0 | 1 | 1 | 0 | 1 | 0 | 0 | 0 | 0 |
| 1 | 1 | 1 | 1 | 0 | 0 | 0 | 1 | 1 | 1 | 1 | 0 | 0 | 0 | 0 | 0 |

TABLE 4

Equation for Shifter Control Bits.

TC = B0*B1*B2 + B0*B1*B3 + B0*B2*B3 + B1*B2*B3

SWAP = B1*B2*B3

SU0 = B0

SU1 = $\overline{B0}$*B1

SU2 = $\overline{B0}$*$\overline{B1}$*B2

SL0 = B0*B1*$\overline{B2}$*$\overline{B3}$ + B0*$\overline{B1}$*B2*B3

SL1 = B0*$\overline{B1}$*B2*$\overline{B3}$ + $\overline{B0}$*B1*B2*$\overline{B3}$ + B0*B1*$\overline{B2}$*B3

SL2 = $\overline{B0}$*$\overline{B1}$*B3 + $\overline{B0}$*$\overline{B2}$*B3 + $\overline{B1}$*$\overline{B2}$*B3 + B0*B1*B2*$\overline{B3}$ The 16-bit multiplicand vector provided by STC 450 to Shifter 470 is either the multiplicand A0 through A15 or its two's complement as determined by the two's complement control bit TC received from the MTC 440.

The Shifter 470 receives the multiplicand vector from the STC 450 and under the control of control bits from the MTC 440 and forms two shifted multiplicand vectors, shifted under the control of the control bits SL and SU from the MTC 440. The four bits of the multiplier slice B are provided to the Shifter 470 and are merged into the shifter output vectors under the control of the swap and two's complement control TC from the MTC 440. The extra LSB are combined with the shifted multiplicand A under the control of the TC signal. The Shifter 470 provides output vectors X, Y and ALL to the Sum Array 40. Since the shifted multiplicand vector includes the least significant bits from the operand adder, they are not true partial products.

The Sum Array 50 receives the shifted multiplicand vectors X and Y and multiplicand ALL from the Shifter 470. Under the control of control bits TC from MTC 440, the Sum Array 50 adds the vectors X and Y and the shifted multiplicand ALL. The Sum Array 50, in absence of the two's complement control bit TC, adds only the shifted vectors X and Y which represent the multiplier A0 through A15 multiplied by the 4-bit multiplier slice of B. With the presence of a two's complement control bit TC, the Sum Array 50 adds the shifted multiplicand A to shifted vectors X and Y, which represent the two's complement of the multiplicand A0 through A15 and the 4-bit slice of the multiplier B.

The relationship of the shifted vectors X and Y and the 4-bit multiplier slice of B are illustrated in Table 5.

TABLE 5

| Shifted Operand Sum — | B3 | B2 | B1 | B0 | | | |
|---|---|---|---|---|---|---|---|
| Vector X — | | X17 | X16 | X15 | ... | X1 | X0 |
| Vector Y — | Y17 | Y16 | Y15 | Y14 | ... | Y1 | Y0 | |

Analysis of Tables 3 and 5 will illustrate the efficiency of the present multiplier architecture wherein the addition of the 4-bit multiplier slice B is in parallel with the two's complement operation to minimize time and thereby eliminate a carry-save stage through the architecture.

The multiplier bits B2 and B3 can be directly inserted into the additional positions X18 and X19 of the vector X. A review of the MPA map of Table 3 reveals that when the two's complement signal TC is a "1", SU2 is always a "0". Since SU2 would shift the vector from the STC 450 two positions to the left in the X register, it being a zero would mean that X17 is always empty when TC is a "1". Thus, the multiplier bit B1 can be inserted in the X17 position for TC=1.

A further analysis of the MPA map of Table 3 indicates that for the last two TC signals of the table, wherein the input B0 through B3 are "1110" and "1111", only SU1 is a "1" and only SU0 is a "1", respectively. Thus, the Y vector is empty or completely free. For the other three two's complemented signal, namely "0111", "1011" and "1101", SU0 is a "1" and thus the position X16 and X17 are vacant. Thus, the least significant B0 of the multiplier may be placed in the vector Y15 for the last two complemented signals in Table 3 since there is no Y vector and places in the X vector at position X16 for the other three conditions. This is under the control of the Swap signal which monitors the coincidence occurrence of B1, B2 and B3 in the multiplier B as indicated in Tables 3 and 4.

The merger of the 4-bit slice of multiplier B, the multiplicand A, the extra least significant bits and the two shifted vectors X and Y into three vectors ALL, X and Y, using the technique just described, is illustrated in FIG. 2b. Using the same philosophy, the remaining vectors of FIG. 2a are merged into the vectors of FIG. 2b using the MPAs 1, 2 and 3. By forming these merged vectors, the number of levels of carry lookahead logic are reduced.

Figure 4:
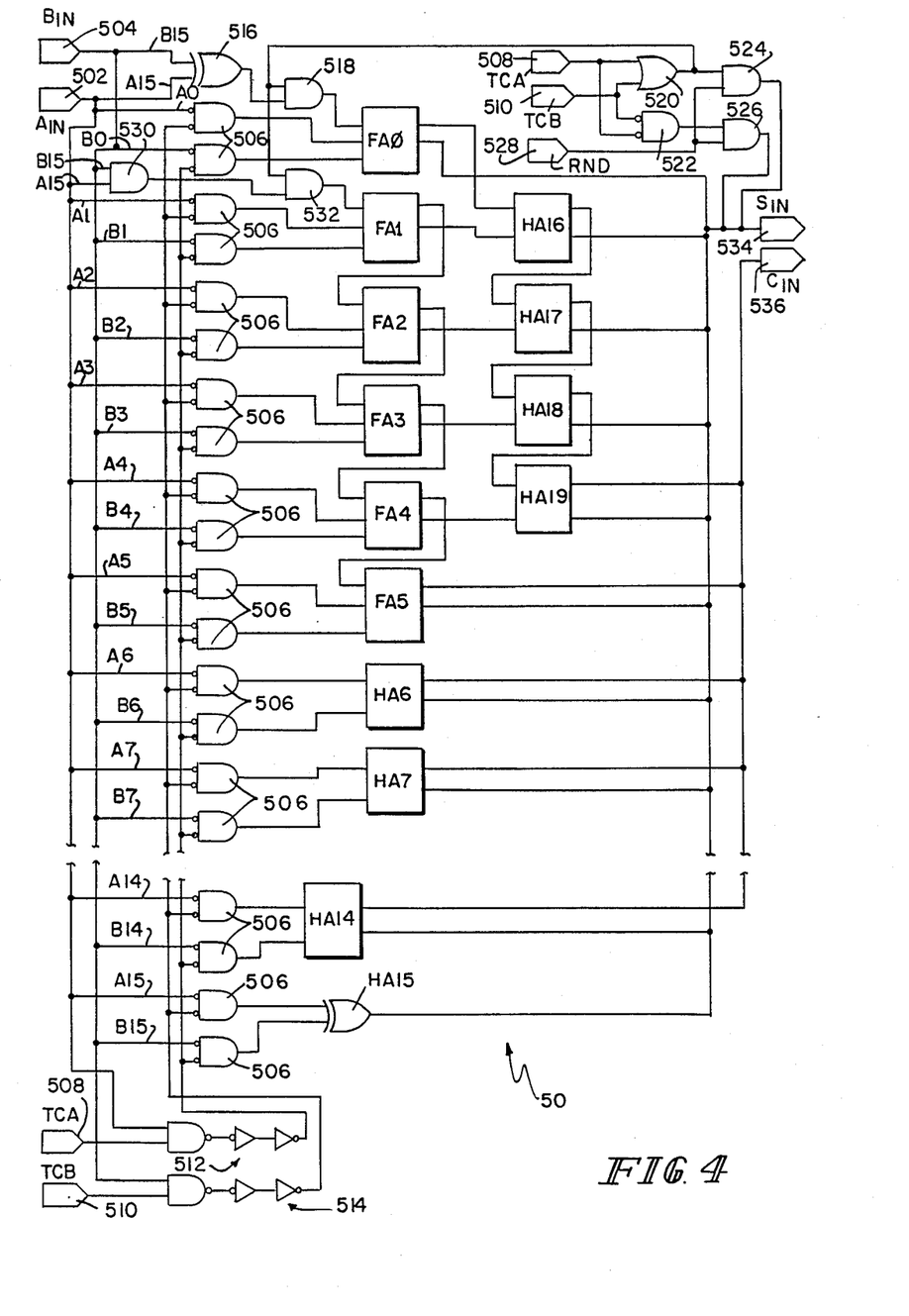
FIG. 4 is a logic diagram of the Correction Factor circuit of FIG. 1.

The details of the correction factor factor circuit 50 is illustrated specifically in FIG. 4. As discussed above, the correction factor circuit 50 provides a correction factor which represents the two's complement of the other operand when one of the operands is a signed, negative or two's complemented representation. Since both of the operands may be signed or two's complemented, the output of the correction factor would be the sum of the two correction factors. The representation of a two's complemented signal is sensed by a two's complement on two's complement inputs TCA and TCB for the operands A and B, respectively. Also, the 16th bit of the operand would be a "1" indicating a signed or two's complemented number.

As illustrated in FIG. 4, each bit of the two input operands A and B, on inputs 502 and 504, respectively, are provided to a respective NOR-gate 506. The two's complement signals TCA and TCB for operands A and B, respectively, are provided on inputs 508 and 510, respectively. The two's complement signal TCA at input 508 is combined with the 16th bit A15 of operand A in an NAND-gate 512 represented by a NAND-gate and two inverters and the two's complement signal TCB and the 16th bit B15 of operand B are combined in an NAND-gate 514, also illustrated by a NAND-gate and two inverters. This is a redundancy check to determine whether the TC signal and the 16th bit both are either low and zero for non-two's complemented numbers, or high or "1" representing a two's complement or signed number. The output of the NAND-gate 512 for the operand A are provided as inputs to the NOR-gates 506 for the B operand and the outputs of the NAND-gate for the B operand provides an input to the NOR-gates 506 of the A operand.

If the NAND-gate 512 determines that TCA and the 16 bit are both high, it provides a low output signal to the NOR-gates 506 for each bit of the operand B. This causes the NOR-gates 506 to invert each bit of the operand B. For all other conditions or combinations of the 16th bit A15 of the operand A and the two's complement signal TCA, the output of NAND-gate 512 to the NOR-gates for the operand B is a "1". Thus, the output of the NOR-gate 506 for vector B will always be a zero irrespective of the value of the individual bits of the operand B. The operation for the NAND-gate 514 for the operand B to control the two's complementation of the operand A is the same as that just described.

The outputs of the NAND-gates 506 for each bit of both operands are provided to an appropriate adder. For bit positions 0 through 5, full adders FA-0 through FA-5 are provided. For bits 6–15, half adders HA-6 through HA-15 are provided. The full adders FA-2 through FA-5 receive a carry from the previous full adder stage.

As in the MPAs, the method of forming two's complement of the operands A and B is accomplished in the correction factor circuit 50 by complementing each of the bits and adding a "1" to the least significant bits. Since the correction factor circuit may produce the summation of the two's complement of both of the operands, the addition of a "1" or a "2" must be performed. Exclusive OR-gate 516 monitors the signed bit A15 and B15 of each of the input operands to determine whether they are two's complemented. If either one is high, it will provide an output signal to AND-gate 518. The other input to AND-gate 518 is from an OR-gate 520 of the rounding circuit which receives its input from the two's complement signal TCA and TCB from inputs 508 and 510, respectively. The other portions of the rounding circuit include a NOR-gate 522, AND-gates 524 and 526 and the round input RND on input 528.

If both of the 16th bits A15 and B15 are high, the exclusive OR-gate 516 will be a low and thus the AND-gate 518 will not provide an input to the full adder for the first bit FA-0. As with the controls through NAND-gates 512 and 514, the use of the 16th bit as well as the two's complement signal provides a redundancy of the same, or a check. AND-gate 530 also monitors the 16th bits and if both of them are high, provides an output to AND-gate 532 which has its second input from the OR-gate 520 of the round circuit to offer the redundancy and provide a "1" to the second full adder FA-1 for the second bit. Thus, if only one of the operands A or B is a signed or two's complemented number, a "1" is added to the first bit in full adder FA-0. If both of the operands A and B are signed or two's complemented numbers, a "1" is added to the second bit, which is equivalent to adding "2".

Half adders HA-16, HA-17, HA-18 and HA-19 add the carry of the previous bit to the sum of that bit to provide the second, third, fourth and fifth summed bits and only one carry for the first five bits. Full adder FA-5 and half adders HA-6 through HA-14 provide a sum and a carry bit. The half adder HA-15 for the 16th bit only provides a sum since the carry is to be ignored as it involves the signed bit. The 18-bit sum vector SIN and the 11-bit carry vector CIN are provided on outputs 534 and 536, respectively, to the Sum Array 60.

Thus it can be seen from the logic diagram of FIG. 4, that the correction factor circuit 50 is inoperative and provides no input to the Sum Array 60 when unsigned operands A and B are being multiplied. When one of the operands A or B is a signed, complemented or negative number, the correction factor provides the complement of the other operand. When both of the operands A and B are signed, negative or complemented, the sum of the two's complement of both operands is provided.

Figure 5:
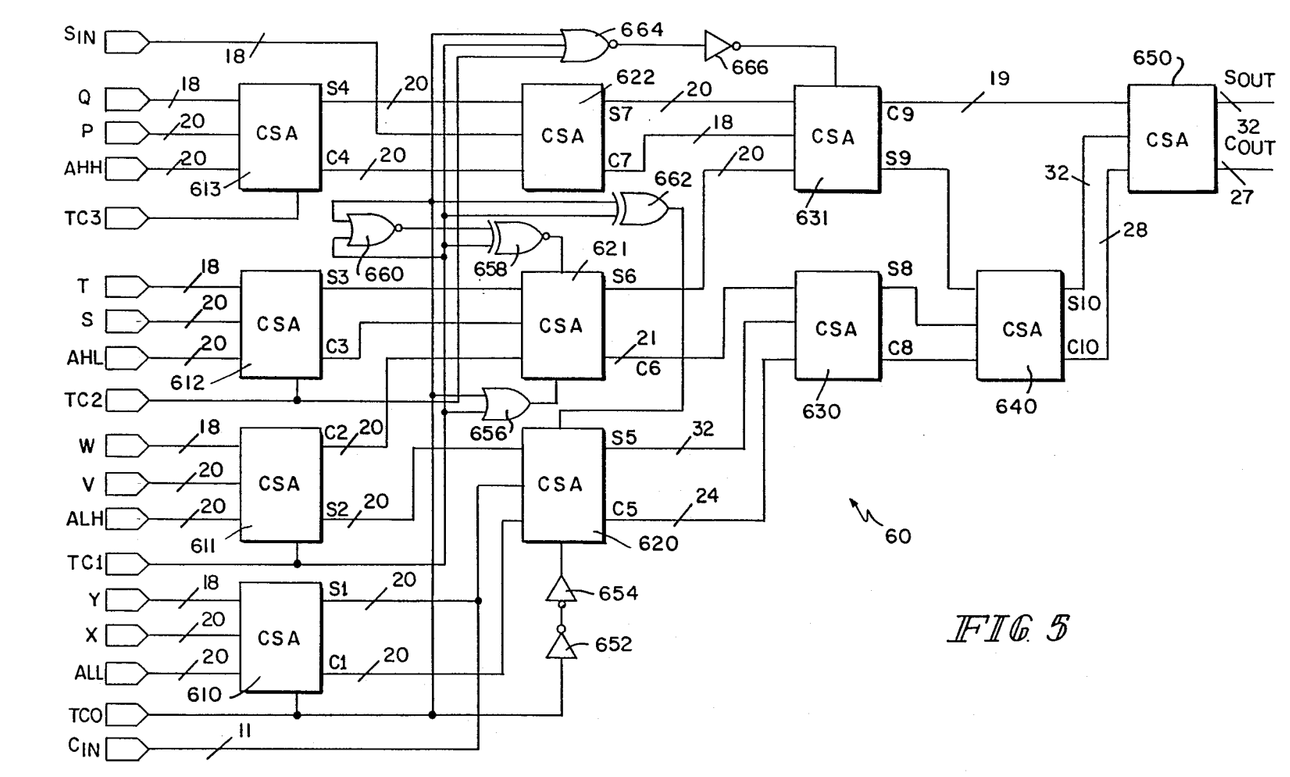
FIG. 5 is a logic diagram of the Sum Array of FIG. 1.

A detailed schematic of the Sum Array 50 is illustrated in FIG. 5 as including five levels of carry lookahead logic. The first level includes carry-save adders 610, 611, 612 and 613; the second level includes carry-save adders 620, 621 and 622; the third level includes carry-save adders 630 and 631; the fourth level includes carry-save adder 640; and the fifth level includes carry-save adder 650. The first level of carry-save adders receives the three respective vectors from MPA circuits MPA-0 through MPA-3 as well as the two's complement signal TC-0 through TC-3. When the respective TC signals TC-0 through TC-3 is low, the carry-save adder of the first level will add only the shifted vectors and not the operand vector A. When the respective TC signal TC-0 through TC-3 is high indicating that a two's complement multiplication for that slice has been performed so as to maintain the number of vectors to a minimum of three, addition of all three of the input vectors to the first level carry-save adders is performed. The output of carry-save adder 610 is S 1 and C 1; the output of carry-save adder 611 is S 2 and C 2; the output of carry-save adder 612 is S 3 and C 3; and the output of carry-save adder 613 is S 4 and C 4.

The second level of carry-save adder combines the output of the first level as well as the sum in SIN and the carry in CIN from the correction factor circuit 50. Carry-save adder 620 includes as an input C1, merged S1 and carry in CIN and S2 and provides the sum output S5 and the carry output C5. The carry-save adder 621 receives as inputs carry C2, carry C3 and sum S3 and provides the sum output S6 and the carry output C6. The carry-save adder 622 receives as inputs the carry C4, the sum in SI from the correction factor circuit 50 and the sum S4 and provides as outputs the sum S7 and the carry C7.

The outputs from the second level of carry-save array are added in the third level of the carry-save array. The carry-save adder 630 receives inputs carry C5, sum S5 and carry C6 and provides as outputs sum S8 and carry C8. The carry-save adder 631 receives as inputs sum S6, carry C7 and sum S7 and provides as outputs sum S9 and carry C9. The fourth level includes carry-save adder 640 receiving as inputs carry C8 and sum S8 and S9 and provides as output sum S10 and carry C10. The fifth and final stage of the output includes carry-save adder 650 which receives as inputs the carry C10, the sum S10 and the carry C9 and provides as outputs SOUT and COUT which are then provided as inputs to the final adder 70 which provides a 32-bit output product P.

Application of the Minimal Path Algorithm to 16×16 bit multiplier architecture leads to the occurrence of a specific arithmetic overflow condition called Local Overflow. This condition occurs when any of the 4-bit multiplier slices B[K,K+4] requires that the multiplicand A be two's complemented. In such a case the addition of two shifted partial vectors will generate a single 1 overflow beyond the local range of the multiplication. In other words, a multiplication of a 4-bit multiplier slice and 16-bit two's complemented multiplicand will result in the correct partial vector with bits A(0) . . . A(19) plus an overflow 1 in the bit position A(20) .

In order to alleviate the error caused by these local overflows, 4-bit offset words are added to bit positions A[20:23], A[24:27] and A[28:31] of the partial vectors whenever two's complementation of any of the four partial vectors is required. The addition and values of the offset words are dependent on the pattern of the three TC signals TC0, TC1 and TC2 indicating which of the first three partial vectors are two's complemented. Table 6 below lists the truth table indicating the values of the offset bits D[31:20] for all eight patterns of the TC signals.

TABLE 6

| TC2 | TC1 | TC0 | D31 | D30 | D29 | D28 | D27 | D26 | D25 | D24 | D23 | D22 | D21 | D20 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 1 | 1 | 1 |
| 0 | 1 | 0 | 1 | 1 | 1 | 1 | 1 | 1 | 1 | 1 | 0 | 0 | 0 | 0 |
| 0 | 1 | 1 | 1 | 1 | 1 | 1 | 1 | 1 | 1 | 0 | 1 | 1 | 1 | 1 |
| 1 | 0 | 0 | 1 | 1 | 1 | 1 | 0 | 0 | 0 | 0 | 0 | 0 | 0 | 0 |
| 1 | 0 | 1 | 1 | 1 | 1 | 0 | 1 | 1 | 1 | 1 | 1 | 1 | 1 | 1 |
| 1 | 1 | 0 | 1 | 1 | 1 | 0 | 1 | 1 | 1 | 1 | 0 | 0 | 0 | 0 |
| 1 | 1 | 1 | 1 | 1 | 1 | 0 | 1 | 1 | 1 | 0 | 1 | 1 | 1 | 1 |

TABLE 7

The set of corresponding logic equations for each bit are:

D31 = D30 = D29 = TC0 + TC1 + TC2
D28 = TC2 :+: (TC1 + TC0) = /(TC2 :+: /(TC1 + TC0))
D27 = D26 = D25 = TC1 + TC0
D24 = TC1 :+: TC0
D23 = D22 = D21 = D20 = TC0 where :+: indicates EXCLUSIVE-OR operator.

The correction factor for Local Overflow is provided in the Sum Array 60 as a function of the two's complemented signals TC-0, TC-1 and TC-2 from the individual MPAs MPA-0, MPA-1 and MPA-2. The TC-O signal is provided through inverters 652 and 654 to the carry-save array logic 620. OR-gate 656 has inputs from TC-0 and TC-1 and provides an input to carry-save adder 621. Exclusive OR-gate 658 receives an input from TC-2, as well as an input from NOR-gate 660 which has inputs from TC-0 and TC-1. The output of exclusive OR-gate 658 is connected to carry-save adder 621. Exclusive OR-gate 662, having inputs from TC-0 and TC-1, also provides an input to the carry-save adder 620. NOR-gate 664 receives inputs from TC-0, TC-1 and TC-2 and provides an output through inverter 666 to carry-save adder 631. These logic gates perform the logic specifically described in Table 7 to provide the correction of Table 6 for local overflow.

It should be noted that the MPAs perform two's complementation of the two operands A and B depending upon the number of "1" s in the 4-bit slice irrespective of whether the operands A and B themselves are signed or unsigned numbers. MPA is a method of minimizing the number of partial products. The correction factor circuit 50 provides an appropriate correction factor if the operands A and B are signed, negative or complemented. It should also be noted that if both of the operands A and B are signed or two's complemented, then the sum of the two's complement of the two's complement number is shifted to the appropriate position and added to the partial product. To illustrate the present invention, Table 8 shows the multiplication of −7 by −3. The correction factor, being the two's complement of −7 and the two's complement of −3, is added to the product of the operands −3 and −7. The result is a positive or uncomplemented 21. The most significant bit is an overflow bit beyond the capability of the system and therefore is dropped.

TABLE 8

Multiplication of Two's Complement Operands with Correction Factor.

```
  1 0 0 1      −7
  1 1 0 1  ×   −3
  1 0 0 1
```

TABLE 8-continued

Multiplication of Two's Complement Operands with Correction Factor.

```
  0 0 0 0
  1 0 0 1
  1 0 0 1
  1 1 1 0 1 0 1
       0 1 1 1           = CF TC −7
       0 0 1 1           = CF TC −3
1 0 0 0 1 0 1 0 1  = 21
```

Table 9 illustrates the principle of the present invention of multiplying a −7 by a −3 using the MPA. Since −3 has more "1" s than "0" s, the MPA performs multiplication of the two's complements of −3 and −7 and adds to it the sum of the original −3 and −7 appropriately shifted. To this result is added the correction factors which is the two's complements of −7 and −3.

TABLE 9

Multiplication of Two's Complement Operands With MPA and Correction Factor.

```
    0 1 1 1  TC −7
    0 0 1 1  TC −3
    0 1 1 1
    0 1 1 1
    0 0 0 0
    0 0 0 0
    0 0 1 0 1 0 1
    1 0 0 1           MPA −7
    1 1 0 1           MPA −3
  1 0 1 1 1 0 1 0 1
       0 1 1 1        CF TC −7
       0 0 1 1        CF TC −3
  1 1 0 0 0 1 0 1 0 1  = 21
```

The results shown in Table 9 is the number 21 with two bits of overflow. Although the original product of the two's complement of −3 and the two's complement of −7 is 21, and the correction from the MPA, as well as the correction factor from the correction factor circuit are inverse of each other, we would expect the final answer to be 21. Although this illustration provides a unique example, this principle would also work for multiplying (7×−3). In such instance the MPA would multiply a −7 and a 3, adding the sum of 7 and −3 and the correction factor based on the original operands would be the two's complement of 7. A comparison of the multiplication of Tables 8 and 9 will illustrate that it is different from the multiplication of Table 2 which is the signed extension multiplication.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A binary multiplier for performing binary multiplication of first and second operands comprising:
   multiplication means for performing unsigned multiplication of said operands and providing a product and including:
   (a) determining means for determining and providing a two's complement signal when said first operand has 1's in more than half of its bits;
   (b) first complementer means for providing a first operand vector as a two's complement of said second operand in response to said two's complement signal or as said second operand in absence of said two's complement signal;
   (c) second complementer means for said providing shift control signals as a function of a two's complement of said first operand in response to said two's complement signal or as a function of said first operand in absence of said two's complement signal;
   (d) shifter means for providing a plurality of shifted second operand vectors as a function of said shift control signals, and
   (e) adder means for adding said first operand, said second operand, and said plurality of shifted second operand vectors in response to said complement signal or adding only said plurality of shifted second operand vectors in absence of said complement signal to produce a product; and
   correction means, including correction complementer means in parallel with said shifter means for complementing said first and second operands, for producing as inputs to said adder means a two's complement of said second operand for a negative first operand as a first correction and a two's complement of said first operand for a negative second operand as a second correction to produce a corrected product.

2. A binary multiplier according to claim 1, wherein said first operand has K bits and said second operand has M bits; and
   wherein said correction means adds said first correction shifted K bits and said second correction shifted M bits relative to the bits of said product.

3. A binary multiplier according to claim 1, wherein said shifting means includes merging means for merging bits of said operands with said shifted second operand vectors in response to said complement signal.

4. A binary multiplier according to claim 3 wherein said multiplication means includes logic means for selecting which bits of which shifted second operand vectors said bits of said operands are merged as a function of said first operand.

5. A binary multiplier according to claim 4, wherein some of the bits of said operands are pre-assigned to a particularly shifted second operand vector and other bits of said second operand vector are assigned by said logic means as a function of said first operand.

6. A binary multiplier according to claim 1, wherein: said determining means, first and second complementer means and shifter means includes a corresponding plurality of determining means, first and second complementer means and shifter means in parallel and receiving all of the bits of said second operand and respective bits of said first operand.

7. A binary multiplier according to claim 6, wherein said adder means includes a plurality of intermediate adder means in parallel for adding a respective plurality of shifted second operand vectors, second operand and respective bits of said first operand as a function of a respective complement signal to produce intermediate sums, and a final adding means for adding said intermediate sums to produce said product.

8. A binary multiplier according to claim 7, wherein each of said shifter means includes merge means for merging respective bits of said first operand with respective shifted second operand vectors in response to a respective complement signal prior to said adder means and said intermediate adder means adds said second operand with respective merged vectors.

9. A binary multiplier according to claim 8, wherein said intermediate adding means are carry-save adders and said final adder means includes a tree of carry-save adders for providing a pair of final sum and carry vectors and means for adding said pair of final sum and carry vectors to produce said product.

10. A binary multiplier according to claim 7, wherein said final adding means adds said first and second corrections to said intermediate sums.

11. A binary multiplier according to claim 6, wherein said adder means includes local overflow logic means for determining local overflow of bits from each of said plurality of determining means and providing a local overflow correction to be added in said adder means.

12. A binary multiplier for performing binary multiplication of first and second operands comprising:
   multiplication means for performing unsigned multiplication of said operands and providing a product;
   correction means for adding to said product
   (a) two's complement of said second operand for a negative first operand as a first correction and
   (b) two's complement of said first operand for a negative second operand as a second correction to produce a corrected product;
   said multiplication means including a plurality of multiplication means in parallel each for performing multiplication of all of the bits of said second operand by respective bits of said first operand;
   each of said plurality of multiplication means including determining means for determining and providing a two's complement signal and complementing corrections when said respective bits of said first operand has 1's in more than half of its bits and each of said plurality of multiplication means performing two's complement multiplication for a presence of its respective two's complement signal and unsigned multiplication for absence of its respective two's complement signal and providing products; and
   adder means for adding said products and complement corrections of said plurality of multiplication and said first and second corrections.

13. A binary multiplier according to claim 12, wherein said adder means for determining local overflow of bits from each of said plurality of determining means and providing a local overflow correction to be added in said adder means.

* * * * *

UNITED STATES PATENT AND TRADEMARK OFFICE
CERTIFICATE OF CORRECTION

PATENT NO. : 4,868,778

DATED : September 19, 1989

INVENTOR(S) : James E. Disbrow & Christopher W. Malinowski

It is certified that error appears in the above-identified patent and that said Letters Patent is hereby corrected as shown below:

Title page, item [75]

ADD INVENTOR:

Christopher W. Malinowski

Melbourne Beach, Fla.

Signed and Sealed this

Twenty-seventh Day of November, 1990

Attest:

HARRY F. MANBECK, JR.

*Attesting Officer*   *Commissioner of Patents and Trademarks*